United States Patent [19]

Aversano

[11] 4,416,909
[45] Nov. 22, 1983

[54] MEAT PRESERVATION METHOD

[76] Inventor: Ralph W. Aversano, 598 Benham St., Hamden, Conn. 06514

[21] Appl. No.: 376,414

[22] Filed: May 10, 1982

[51] Int. Cl.$^3$ ............................ A23B 4/02; A23B 4/12
[52] U.S. Cl. .................................... 426/265; 426/332; 426/652
[58] Field of Search ............... 426/264, 265, 281, 332, 426/331, 532, 641, 646, 652, 644, 266, 268, 269; 252/400 R, 407

[56] References Cited

U.S. PATENT DOCUMENTS

| | | | |
|---|---|---|---|
| 2,294,428 | 9/1942 | Stockhamer | 426/652 X |
| 2,488,184 | 11/1949 | Garnatz et al. | 426/643 |
| 2,628,905 | 2/1953 | Antle et al. | 426/268 |
| 3,134,678 | 5/1964 | Wierbicki et al. | 426/266 |
| 3,154,421 | 10/1964 | Voegeli et al. | 426/265 |
| 3,666,488 | 5/1972 | Nakao et al. | 426/266 |
| 3,878,307 | 4/1975 | Coleman et al. | 426/266 |
| 3,982,030 | 9/1976 | Alsina | 426/332 X |
| 4,279,934 | 7/1981 | Hutchison et al. | 426/643 X |

FOREIGN PATENT DOCUMENTS

| | | | |
|---|---|---|---|
| 51-67751 | 6/1976 | Japan | 426/332 |
| 1245227 | 9/1971 | United Kingdom | 426/265 |

*Primary Examiner*—Arthur L. Corbin
*Attorney, Agent, or Firm*—Bachman and LaPointe

[57] ABSTRACT

This invention resides in a composition and method for treatment of meat or poultry with said composition to maintain the color and to preserve same. The composition comprises as essential constituents between about 10 and 40% each of the following materials:

(1) ascorbic acid and/or the sodium or potassium salts thereof;
(2) citric acid and/or the sodium or potassium salts thereof;
(3) sodium or potassium carbonate; and
(4) sulfite, bisulfite or metabisulfite of sodium or potassium.

These materials represent a synergistic combination which preserves the color and freshness of meat products for a surprisingly long period of time.

7 Claims, No Drawings

MEAT PRESERVATION METHOD

BACKGROUND OF THE INVENTION

This invention relates to a process and composition for treating edible meat and meat products to maintain a desirable meat color and also to preserve the freshness thereof.

Myoglobin, hemoglobin and other like compounds found in meat are commonly believed to be responsible for the red and red-purple color of fresh meat. Upon exposure to air these compounds are oxidized to oxymyoglobin and oxyhemoglobin which are bright red in color. Exposure to air over prolonged periods results in further oxidation to metmyoglobin and methemoglobin which are brown or grey in color and which detract from the appearance and saleability of the meat.

Conventional meat color preserving agents are known, such as ascorbic acid and/or nicotinic acid, which function by reacting with the myoglobin and hemoglobin, either before or after they are oxidized, to form a color which is relatively stable over longer periods of time. However, continued exposure to the air will cause a further oxidation reaction with a resultant undesirable change in the color of the meat product to brown or grey.

At the same time it is well known that fresh meat products are susceptible to spoilage on storage. In order to keep fresh meat products from rapid spoilage it is customary to keep them refrigerated so that the rate of bacterial growth is retarded. It is naturally desirable to provide a composition and method which is effective to still further retard bacterial growth and maintain the freshness of meat and meat products.

Accordingly, it is a principal object of the present invention to provide a composition and method which effectively treats meat and meat products to maintain a desirable meat color.

It is a further object of the present invention to provide a composition and method as aforesaid which retards bacterial growth and maintains meat freshness.

It is a still further object of the present invention to provide a composition and method which is inexpensive, easy to apply and which is based on materials which may be safely used in meat products.

Further objects and advantages of the present invention will appear from the ensuing discussion.

SUMMARY OF THE INVENTION

In accordance with the present invention, it has been found that the composition and method of the present invention effectively achieves the foregoing objects and advantages in a simple, convenient and expeditious manner.

The composition of the present invention effectively treats edible meat and meat products to maintain the desirable meat color thereof and to maintain freshness. The composition consists essentially of 10 to 40% of each of the following components:
 (a) a material selected from the group consisting of ascorbic acid, the sodium and potassium salts thereof and mixtures thereof;
 (b) a material selected from the group consisting of citric acid, the sodium and potassium salts thereof and mixtures thereof;
 (c) a material selected from the group consisting of sodium carbonate, potassium carbonate and mixtures thereof; and
 (d) a material selected from the group consisting of sodium and potassium sulfite, bisulfite and metabisulfite and mixtures thereof.

In accordance with the present invention a composition as aforesaid is applied to the fresh meat in an amount of from ¼ ounce to 2 pounds per hundred pounds of meat being treated.

DETAILED DESCRIPTION

The composition of the present invention may be effectively used in preserving the color and freshness of fresh meats and meat products and finds its greatest utility in this application; however, its use is not limited thereto and it may also be used to treat aged and cured meats. In accordance with the present invention, whole meat, such as cuts of meat or whole carcasses, may be treated by dusting the exposed surfaces with the composition of the present invention or by spraying the surfaces with a solution thereof. For carcasses, treatment may be accomplished by injecting a solution of the composition of the present invention into the arteries and veins. For ground meat, the treating materials may be applied to the exposed surface of the ground meat or added to the meat before or during grinding to permit distribution thereof throughout the ground mass. It is preferred in accordance with the present invention that the components thereof be thoroughly mixed together before application to the meat product.

In accordance with the present invention, the ascorbic acid component may be ascorbic acid itself and/or the sodium and/or potassium salts thereof. Similarly, the citric acid component may be the citric acid itself and/or the sodium and/or potassium salts thereof, i.e., sodium or potassium citrate.

Either sodium and/or potassium carbonate may be employed. The sulfite component may be a sulfite, bisulfite and/or metabisulfite of sodium and/or potassium.

The amounts of the components of the present invention are as stated hereinabove. Preferably, substantially equal quantities of each of the components are employed.

In accordance with a preferred embodiment of the present invention, a suitable quantity of ground meat is first ground and mixed with a suitable quantity of the composition of the present invention and the mixture reground. In accordance with an alternate embodiment for red meats or poultry, a suitable quantity of the composition of the present invention is dissolved in water and the edible meat product sprayed with the aqueous solution. Naturally, alternate methods of application of the composition of the present invention may be readily employed.

Naturally, additional freshness or color preservatives may, if desired, be added to the meat such as nitrates or nitrites, phosphates, nicotinic acid or other known color or freshness preservatives. The surprising feature of the composition of the present invention is the synergistic combination of the components thereof which effectively preserves color and freshness for an inordinately long period of time far beyond what would normally be anticipated.

The foregoing will be more clearly apparent from the examples which form a part of the present specification.

EXAMPLE I

A composition of the present invention was formulated by mixing together equal amounts of sodium bisulfite, ascorbic acid, citric acid and sodium carbonate. Fifty pounds of fresh red hamburger was first ground and then thoroughly mixed with two ounces of the foregoing mixture. The mixture was then reground and stored in a refrigerated condition at a temperature of approximately 35° F. The resultant meat retained its bright red color and freshness for approximately two weeks. Untreated meat darkened after about one week and at the end of the two week period was quite dark and no longer fresh.

EXAMPLE II

Two ounces of the composition of Example I were thoroughly dissolved in two quarts of water. The composition was sprayed on various samples of poultry and red meats. The resultant sprayed samples were stored in a refrigerated condition as in Example I and maintained their color and freshness for approximately two weeks. Comparable materials lost their color after about one week and were no longer fresh after the two week period.

EXAMPLE III

A piece of veal which had started to discolor was tested in a variety of ways. Firstly, a portion of this material was treated with two ounces of a composition containing equal amounts of ascorbic acid, citric acid and sodium carbonate. The material was stored in the refrigerated condition at about 35° F. After about three days, the material showed clear signs of decay. Another portion of this material was treated with two ounces of sodium bisulfite only under the same conditions and showed clear signs of decay after five days. A third sample was treated with two ounces of the composition of Example I as aforesaid. The material showed no signs of decay after two weeks of storage.

EXAMPLE IV

A variety of experiments were conducted with a variety of compositions on beef which had been previously stored to the point where the meat was starting to discolor.

Composition A was 1/10 of an ounce each of ascorbic acid, citric acid and sodium bisulfite. The material thus treated showed clear signs of decay after five days' storage in the refrigerated condition at approximately 35° F.

Composition B represented 1/10 of an ounce each of ascorbic acid and sodium bisulfite. The treatment conditions were the same as above and the material showed clear signs of decay after three days' storage.

Composition D represented 1/10 of an ounce of sodium carbonate. The meat showed clear signs of decay after three days' storage.

Composition E represented 1/10 of an ounce each of sodium carbonate, ascorbic acid and citric acid. The material showed clear signs of decay after five days.

Composition F represented the composition of the present invention with 1/10 of an ounce each of sodium bisulfite, citric acid, ascorbic acid and sodium carbonate. The material showed no signs of decay after two weeks' storage.

EXAMPLE V

Example I was substantially repeated using potassium bisulfite, potassium carbonate, potassium citrate and potassium ascorbate. The same excellent results were obtained as in Example I.

EXAMPLE VI

In this example, eleven individual packages of beef were prepared, cut into approximately 1" cubes. The beef had previously been stored for a period of 7 days. Each cube was treated with one tenth ounce of the composition of the present invention containing equal amounts of ascorbic acid, citric acid, sodium carbonate and sodium bisulfite. Daily an unopen package was removed, ground under sterile conditions with sterile phosphate buffer, serially diluted and tested for aerobic plate count and coliform count. All samples were held under refrigerated conditions at approximately 35° F. during the course of the study. In accordance with this study, a bacterial population of below 1,000,000 per milliliter is the generally recommended standard for beef. The results are shown in the following table.

TABLE I

| Day | Color | Odor | Aerobic Count 35° F. | Coliform Contamination |
|---|---|---|---|---|
| 1 Initial Count | Good | Good | 220,000 | <1 |
| 2 24 hr. Count | Good | Good | 240,000 | 9 |
| 3 48 hr. Count | Good | Good | 240,000 | 4 |
| 4 72 hr. Count | Turning Brown | Good | 260,000 | 4 |
| 5 96 hr. Count | Turning Brown | Good | 250,000 | <1 |
| 6 120 hr. Count | Turning Brown | Good | 280,000 | <1 |
| 7 144 hr. Count | Brownish Red | Good | 12,000,000 | <1 |
| 8 168 hr. Count | Brownish Red | Good | 16,000,000 | <1 |
| 9 192 hr. Count | Brownish Red | Good | 20,000,000 | <1 |
| 10 216 hr. Count | Brownish Red | Good | 150,000 | <1 |
| 11 240 hr. Count | Brownish Red | Good | 600,000 | <1 |

The results of the study clearly showed that the preservative maintained the bacterial population well below the 1,000,000 count per milliliter generally recommended as a standard for beef for the first six days of the study. This was supported by organalyptic testing. After five days the counts increased markedly to the tenth day. Coliform counts did not seem a factor. Spurious coliform counts on the second, third and fourth days were believed to have resulted from contamination during the packaging of the samples. On the tenth and eleventh days, the counts again dropped so that the particular packages in question may have received more of the preservatives.

The foregoing data clearly shows that the composition of the present invention is capable of maintaining acceptable bacterial counts for at least six days and possibly longer even after the meat has been previously stored for an extended period of time when the meat is held at normal refrigeration temperatures.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for treating edible meat and meat products to maintain the desirable meat color thereof and to maintain freshness which comprises applying to said meat, from ¼ ounce to 2 pounds per hundred pounds of meat, a composition consisting essentially of from 10 to 40% of each of the following components:
   (a) a material selected from the group consisting of ascorbic acid, the sodium and potassium salts thereof and mixtures thereof;
   (b) a material selected from the group consisting of citric acid, the sodium and potassium salts thereof and mixtures thereof;
   (c) a material selected from the group consisting of sodium carbonate, potassium carbonate and mixtures thereof; and
   (d) a material selected from the group consisting of sodium and potassium sulfite, bisulfite and metabisulfite and mixtures thereof.

2. A method according to claim 1 wherein said components are present in substantially equal quantities.

3. A method according to claim 1 wherein said components are ascorbic acid, citric acid, sodium carbonate and sodium bisulfite.

4. A method according to claim 1 wherein said meat products are selected from the group consisting of red meats, veal and poultry.

5. A method according to claim 1 wherein said meat is hamburger and wherein said components are admixed therewith.

6. A method according to claim 1 wherein an aqueous solution of said components is sprayed on said meat.

7. A method according to claim 1 wherein said meat is dusted with said components.

* * * * *